United States Patent [19]

Stovring

[11] Patent Number: 5,005,045
[45] Date of Patent: Apr. 2, 1991

[54] REPROGRAPHIC CAMERA SYSTEM

[75] Inventor: Knud S. Stovring, Holte, Denmark

[73] Assignee: Helioprint Als, Kvistgaard, Denmark

[21] Appl. No.: 469,547

[22] PCT Filed: Nov. 2, 1988

[86] PCT No.: PCT/DK88/00178
§ 371 Date: Mar. 20, 1990
§ 102(e) Date: Mar. 20, 1990

[87] PCT Pub. No.: WO89/04506
PCT Pub. Date: May 18, 1989

[30] Foreign Application Priority Data

Nov. 3, 1987 [DK] Denmark .................. 5759/87

[51] Int. Cl.$^5$ ................ G03B 27/74; G03B 27/80
[52] U.S. Cl. ........................ 355/68; 355/77; 354/131
[58] Field of Search ............... 355/68, 69, 77, 133; 356/218; 354/289.1, 289.12, 289.11, 131, 67

[56] References Cited

U.S. PATENT DOCUMENTS 3,185,056  5/1965  Gold et al. ................ 354/131
4,443,090  4/1984  Miyakawa et al. ........ 354/289.12

Primary Examiner—L. T. Hix
Assistant Examiner—D. Rutledge
Attorney, Agent, or Firm—Sughrue, Mion, Zinn, Macpeak & Seas

[57] ABSTRACT

A reprographic camera system uses a reprographic camera (1) with a vertical optical axis and a mainly horizontal original table (3) positioned under the objective lens (2) of the camera. An arrangement separate from the camera for the transfer of signals of density and/or picture data to an exposure control system in the camera includes a transducer/or wireless information transfer from the arrangement to the exposure control system (9). The arrangement may include a freely movable densitometer (4) for measuring density values in the original and/or a calcuiator unit (5) provided with a keyboard for keying in picture data.

8 Claims, 2 Drawing Sheets

REPROGRAPHIC CAMERA SYSTEM

BACKGROUND OF THE INVENTION

The invention relates to a reprographic camera system comprising a reprographic camera with a vertical optical axis and a mainly horizontal, original table positioned under the objective lens of the camera. It also relates to an arrangement separate from the camera intended to transfer signals of density and/or picture data to an exposure control means in the camera.

Reprographic camera systems of this type are used for the reproduction of pictures and/or text in black and white or colors. The basis of controlling the exposure of the camera includes a main exposure and a so-called bump exposure and possibly a pre-illumination, In that respect, either a direct measurement of the density values of the original must be effected and conversion of the measured values to signals used for adjusting the camera control by a densitometer, that is an instrument manually movable across the original placed on the original table, or a transfer of density and picture data to the camera from a calculator unit provided with a keyboard and which may either be an integrated part of the camera or a unit separate from the camera.

In known reprographic camera systems the transfer of signals to the camera from the densitometer or a possible separate keyboard calculator unit is effected via usual wire or cable connections, thereby limiting the physical movement possibilities of the densitometer and the possible placements of the calculator unit in relation to the camera.

SUMMARY OF INVENTION

To remedy said drawback the reprographic camera system according to the invention is characterized in that the reprographic camera and said arrangement include transducer means for wireless transfer of signals from said arrangement to the exposure control means.

The wireless transfer of signals preferably performed by using ultrasound or infrared radiation increases considerably the movability of the densitometer, thereby enabling it to move freely across the original table or even to measure density values of originals placed outside the original table. It also allows free placement of keyboard calculator unit which may be a hand-held computer or a desk-top computer.

BRIEF DESCRIPTION OF THE DRAWING

The invention will now be explained in the following with reference to the accompanying drawings, in which.

DETAILED DESCRIPTION OF THE PREFERRED EMBODIMENT

Figure 1:
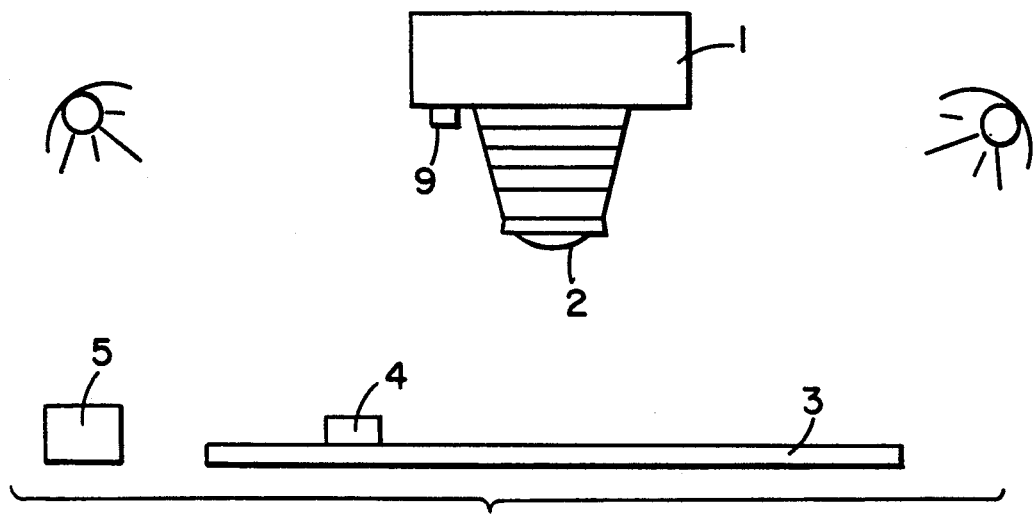
FIG. 1 illustrates an embodiment of a reprographic camera according to the invention.

In FIG. 1 the reprographic camera system includes a camera 1 with a vertical optical axis and an objective lens 2 beneath which an original table 3 is arranged upon which the originals to be reproduced are placed.

For measuring the density values of the original generally displayed on a scale from 0.00 to 4.00 a densitometer in the form of a movable hand-held instrument 4 may be moved in the original plane and placed anywhere on the original, or in respect of pre-recording density data the densitometer may be moved across an original not yet placed on the original table.

In the illustrated embodiment a keyboard calculator unit 5 for pre-setting picture and exposure values is formed as a separate unit separate from the camera. Such a calculator unit may comprise a memory, not shown, for storing density and picture data corresponding to a number of different originals.

Figure 2:
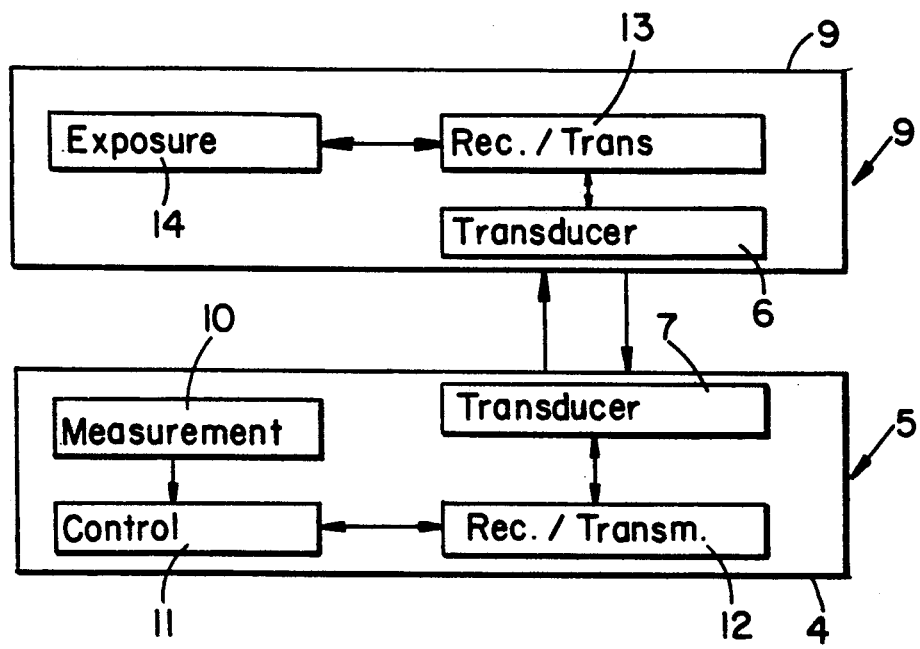
FIG. 2 shows a simplified block diagram of the transfer of signals from a densitometer to a camera.
Figure 3:
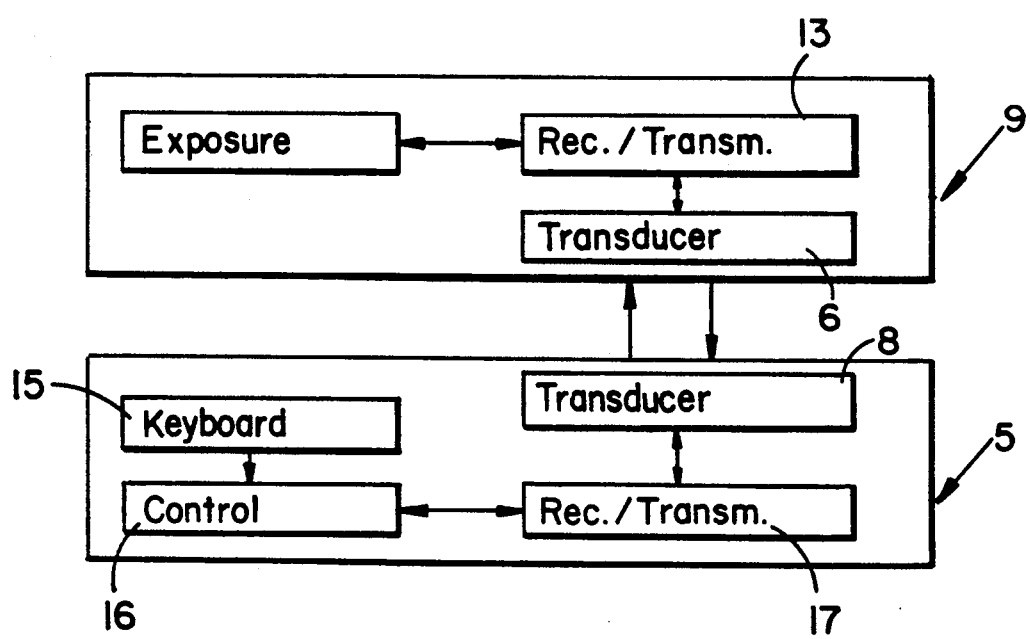
FIG. 3 is a similar block diagram of a keyboard calculator unit for a camera.

To accomplish wireless transferring signals between the camera 1 and the densitometer 4 and/or the calculator unit 5, each one of said devices comprises, as shown in FIGS. 2 and 3, transducers means 6, 7 and 8, respectively, said transducer means being preferably ultrasonic transducers or infrared transducers converting the density values and/or the signals of density values of electrical signals and/or the picture or exposure data pre-programmed in the calculator unit 5 via the keyboard 15 or pre-recorded via the densitometer, into ultrasonic or infrared signals which are further converted in camera 1 to electrical signals capable of controlling the exposure control means 9 of the camera.

The densitometer 4 comprises an opto-electric measuring transducer 10 such as a photo-cell emitting electrical signals to the control electronics 11 of the densitometer, the electronics emitting again signals to a receiver/transmitter unit 12 communicating with the transducer means 7.

Similarly, in connection with the transducer means 6 the reprographic camera comprises a receiver/transmitter unit 13 emitting control signals to the exposure control unit 14 formed as a processor unit.

As mentioned above, the calculator unit 5 may include a memory for storing density and picture data for a large number of pictures. Accordingly, the signal transfer system is arranged so that said memory, with respect to transferring the density and picture data corresponding to a determined one of a number of originals, may be addressed from the central processor unit of the camera via the transducer means 8 in communication with a receiver/transmitter unit 17 connected to the control electronics 16 of the calculator unit.

I claim:

1. A reprographic camera system comprising; a reprographic camera (1) with a vertical optical axis and a mainly horizontal, original table (3) positioned under the objective lens (2) of the camera, an arrangement separate from the camera for the transfer of signals of density and/or picture data to an exposure sure control device in the camera, wherein, the reprographic camera (1) and said device include transducer means (6, 7, 8) for wireless transfer of signals from said arrangement to the exposure control means.

2. A reprographic camera system as claimed in claim 1, wherein in that said arrangement includes a freely movable densitometer (4) for measuring density values in the original.

3. A reprographic camera system as claimed in claim 1 wherein, said arrangement includes a calculator unit (5) provided with a keyboard for keying density and picture data and for transferring said data to the exposure control means (9).

4. A reprographic camera system as claimed in claim 1 wherein, the signal connection between said arrangement and the camera is a two-way connection.

5. A reprographic camera system as claimed in claim 3 wherein, said calculator unit (5) includes a memory device for storing density and picture data corresponding to a number of pictures.

6. A reprographic camera system as claimed in claim 2 wherein, in that said arrangement includes a calculator unit (5) provided with a keyboard for keying density and picture data and for transferring said data to the exposure control means (9).

7. A reprographic camera system as claimed in claim 2 wherein, connection between said arrangement and the camera is a two-way connection.

8. A reprographic camera system as claimed in claim 4 wherein, said calculator unit (5) includes a memory device for storing density and picture data corresponding to a number of pictures.

* * * * *